(12) United States Patent
Fujita et al.

(10) Patent No.: US 9,522,448 B2
(45) Date of Patent: Dec. 20, 2016

(54) MANUFACTURING METHOD FOR SEAT FRAME STRUCTURE

(71) Applicant: Delta Tooling Co., Ltd., Hiroshima-shi (JP)

(72) Inventors: Hitoshi Fujita, Hiroshima (JP); Etsunori Fujita, Hiroshima (JP); Seiji Kawasaki, Hiroshima (JP); Yumi Ogura, Hiroshima (JP); Katsuhiro Inoue, Hiroshima (JP); Toshiya Kushiyama, Aki-gun (JP); Eiji Sugimoto, Aki-gun (JP); Minoru Nakamura, Aki-gun (JP); Ryuji Kuwano, Aki-gun (JP); Masahiro Kuromoto, Aki-gun (JP); Katsutoshi Aratani, Aki-gun (JP); Koji Wakita, Aki-gun (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 166 days.

(21) Appl. No.: 14/361,490

(22) PCT Filed: Nov. 23, 2012

(86) PCT No.: PCT/JP2012/080398
§ 371 (c)(1),
(2) Date: May 29, 2014

(87) PCT Pub. No.: WO2013/080895
PCT Pub. Date: Jun. 6, 2013

(65) Prior Publication Data
US 2014/0317931 A1    Oct. 30, 2014

(30) Foreign Application Priority Data

Nov. 29, 2011   (JP) .................................. 2011-261056

(51) Int. Cl.
B60N 2/22        (2006.01)
B23P 19/04       (2006.01)
B60N 2/68        (2006.01)

(52) U.S. Cl.
CPC ................ B23P 19/04 (2013.01); B60N 2/22 (2013.01); B60N 2/682 (2013.01); *Y10T 29/49622* (2015.01)

(58) Field of Classification Search
CPC .................. Y10T 29/49622; Y10T 29/49904; B60N 2/20; B60N 2/3002; B60N 2/3004; B60N 2/3009; B60N 2/3011; B60N 2/68; B23P 19/04; B23P 19/10
See application file for complete search history.

(56) References Cited

U.S. PATENT DOCUMENTS

| 5,499,863 A * | 3/1996 | Nakane ................. B60N 2/682 |
| | | 297/452.18 |
| 2012/0193954 A1* | 8/2012 | Sakkinen ............. B60N 2/4235 |
| | | 297/216.13 |

FOREIGN PATENT DOCUMENTS

| JP | 7-31526 | 2/1995 |
| JP | 09-142185 | 6/1997 |

(Continued)

OTHER PUBLICATIONS

International Search Report Issued Dec. 18, 2012 in PCT/JP12/080398 filed Nov. 23, 2012.

*Primary Examiner* — Jason L Vaughan
*Assistant Examiner* — Amanda Meneghini
(74) *Attorney, Agent, or Firm* — Oblon, McClelland, Maier & Neustadt, L.L.P.

(57) ABSTRACT

A predetermined component such as a recliner is attached to a long member in advance, and thereafter by bending the long member, a pair of side frames and an upper frame are integrally formed. Therefore, the recliner can be attached to (Continued)

the long member not bent yet and thus in a substantially flat state, and in addition, the pair of side frames and the upper frame can be integrally formed, which does not require labor and contributes to a reduction in manufacturing cost. Moreover, by adjusting a position where the bending is performed, it is possible to manufacture seat frame structures different in dimension even if the long members not bent yet have the same length, and from this viewpoint as well, it is possible to reduce labor and manufacturing cost.

9 Claims, 11 Drawing Sheets

(56) References Cited

FOREIGN PATENT DOCUMENTS

| JP | 09142185 A | * | 6/1997 |
|---|---|---|---|
| JP | 09-252873 | | 9/1997 |
| JP | 2001-054440 | | 2/2001 |
| JP | 2001054440 A | * | 2/2001 |
| JP | 2001-327358 | | 11/2001 |
| JP | 2001327358 A | * | 11/2001 |
| JP | 2010-046162 | | 3/2010 |

* cited by examiner

⊗ is spot welding position.

MANUFACTURING METHOD FOR SEAT FRAME STRUCTURE

TECHNICAL FIELD

The present invention relates to a manufacturing method for a seat frame structure which is a skeletal frame of a seat back part or a seat cushion part of a seat structure.

BACKGROUND ART

For example, Patent Document 1 discloses a frame structure which relates to a frame structure of a seat back part and in which, without using pipes, plate-shaped members given increased strength by closing their cross sections are used and are arranged so that their width direction becomes a front and rear direction of a vehicle. In this case, as the frame structure, frames made of the four separate plate-shaped members corresponding to a pair of left and right side frames, an upper frame, and a lower frame are prepared in advance, and these frames are welded with end portions thereof confronted with each other, to be integrated.

PRIOR ART DOCUMENT

Patent Document

Patent Document 1: Japanese Patent Application Laid-open No. 2010-46162

DISCLOSURE OF THE INVENTION

Problems to be Solved by the Invention

In Patent Document 1, the four separate plate-shaped members are used as the pair of left and right side frames, the upper frame, and the lower frame, and therefore, in order to manufacture a plurality of kinds of seat frame structures different in dimension, it is necessary to prepare a plurality of kinds of plate-shaped members having predetermined dimensions as the plate-shaped members in the separate state, which requires labor and cost and increases weight. Further, a problem of strength and rigidity occurs in welded portions. In particular, $CO_2$ welding has a problem of red/blue shortness. Further, in spot welding, strength depends on strength of only contact points, which necessitates increasing rigidity of the frame. In order to make the plate thickness as thin as possible, Patent Document 1 adopts the method of closing the cross section, but in any case, in view of strength and rigidity, the number of welded portions is desirably smaller.

On the other hand, in Patent Document 1, though recliners are illustrated, no mention is given of details of a step of attaching the recliners to the side frames. However, if the recliners are attached before the welding of the pair of side frames, the upper frame, and the lower frame, spatter is likely to adhere to the recliners, and due to such a reason, in the case of such a frame structure, the recliners are generally attached after a three-dimensional skeletal frame is made by the welding work of the frames.

The present invention was made in consideration of the above, and has an object to provide a manufacturing method for a seat frame structure which is capable of forming even seat frame structures different in dimension from the same member, reducing the kinds of the members prepared according to the respective dimensions to realize the use of the same members, and reducing the labor of preparing and storing the members, thereby realizing a reduction in manufacturing cost. Another object is to provide a manufacturing method for a seat frame structure capable of reducing the adhesion or the like of spatter to a predetermined component such as a recliner by devising a position where the predetermined component such as the recliner is attached to a long member and a position at which subsequent welding and the like is performed, and capable of facilitating a work by enabling to perform an attaching work of the predetermined component to the long member which has not been bent and is in a two-dimensional and thus substantially flat state.

Means for Solving the Problem

In order to solve the aforesaid problem, a manufacturing method for a seat frame structure of the present invention is a manufacturing method for a seat frame structure which is a skeletal frame of a seat back part or a seat cushion part of a seat structure, the method including: a first step of attaching a predetermined component at a predetermined position of a long member having a predetermined length while the long member is kept in a substantially flat state; and a second step of bending the long member at predetermined positions in a state where the predetermined component is attached to the long member, to form a pair of side frames and one end frame located between one-side ends of the pair of side frames, the pair of side frames and the one end frame forming the seat frame structure.

Preferably, the single long member is used, and after executing the step of attaching the predetermined component in the first step, the pair of side frames and the one end frame located between the one-side ends of the pair of side frames are formed integrally by the bending in the second step. It is also possible that two pieces of the long members are used, the step of attaching the predetermined component in the first step is executed for each of the long members, next the two long members are joined with end portions thereof confronted each other, and thereafter in the second step, the joined long members are bent to integrally form the pair of side frames and the one end frame located between the one-side ends of the pair of side frames. It is also possible that two pieces of the long members are used, the step of attaching the predetermined component in the first step is executed for each of the long members, and next, the bending in the second step is executed for each of the long members to work each of the long members into a substantially L-shape having a substantially half portion of the one end frame and a portion corresponding to the side frame adjacent to the substantially half portion, and the long members worked into the substantially L-shape are joined, with the substantially half portions of the one end frame confronted with each other.

The first step preferably includes a step of working a flat plate member into a predetermined cross sectional shape to form the long member. In the first step, the predetermined component can be attached to the long member in the substantially flat state by any of fastening means including welding fastening, caulking fastening, and bolt fastening. The first step can include a step of heat-treating at least part of the long member. Preferably, the method further includes, after forming the pair of side frames and the one end frame, a third step of joining another end frame between other ends of the pair of side frames to form a rigid structure. Preferably, in the first step, the predetermined components are attached to surfaces opposite surfaces, of the pair of side frames, which are joined to the other end frame. Preferably, in the first step, portions corresponding to rear edge portions of the pair of side frames after the bending are each worked into a cross sectional shape protruding inward in terms of a direction after the bending so that the portions serve as joining margins of the other end frame. Preferably, in the second step, by adjusting at least one of a bending position, the number of bending positions, a bend radius, a bending angle, and a bent portion shape at the time of the bending of the long member, structures different in dimension and shape are manufactured by using the long members with the same dimension and shape. Preferably, the method has a step of aligning the predetermined components attached to the long member, after the second step and before the rigid structure is formed by the execution of the third step. Preferably, the pair of side frames and the one end frame correspond to a pair of side frames and an upper frame forming the seat back part. The predetermined component can include at least one of a recliner-associated component, a lumbar support-associated component, a headrest-associated component, and an adjusting mechanism-associated component. Preferably, the predetermined component is the recliner-associated component, and in the aligning step executed after the second step and before the rigid structure is formed by the execution of the third step, a connection rod is connected between left and right recliners attached to the pair of side frames, and the aligning is performed so that centers of the left and right recliners are aligned with an axis of the connection rod.

Effect of the Invention

According to the present invention, the predetermined component such as the recliner is attached to the long member in advance, and thereafter by the bending, the pair of side frames and the one end frame are formed. That is, the attaching work of the component such as the recliner is executed before the bending is performed, that is, while the long member is in a two dimensional and thus substantially flat state, which can facilitate the attaching work as compared with a conventional case where the component is attached after a three-dimensional skeletal frame is formed. Further, the attachment to the long member in the two-dimensional and thus substantially flat state means that the work may be done from an upper surface direction or a low surface direction of the long member, which can greatly contribute to automation using a robot or the like, resulting in a reduction in manufacturing cost. Further, if the long member in such a substantially flat state is heat-treated, heat treatment devices can be disposed on upper and lower sides across the long member, which can facilitate, reduce cost of, and automate a heat-treatment work for increasing strength.

In the present invention, after the above operations are performed while the long member is kept in the substantially flat state, the bending is performed to form the three-dimensional seat frame structure. Therefore, it is possible to integrally form the pair of side frames and the one end frame, which does not require labor and also contributes to a reduction in manufacturing cost. In addition, by adjusting the positions where the bending is performed, it is possible to manufacture seat frame structures different in dimension and shape even if the long members not bent yet have the same dimension, which can reduce the kinds of members prepared in advance to reduce the labor of preparing and storing the members to be worked and reduce manufacturing cost, as compared with a conventional art.

Further, when the other end frame is welded to the side frames, the welding can be executed on the surfaces opposite the predetermined components such as the recliners attached to the side frames, which can reduce the adhesion of spatter to the predetermined components such as the recliners. Further, in a case where left and right movements have to be synchronized for a smooth operation as in the recliners, high accuracy in their attachment position is required. When the recliners or the like are attached after connecting parts of the side frames, the upper frame, and the lower frame are welded to be fixed, that is, after the rigid structure is formed as in the conventional art, dimension adjustment is required at the time of the welding in order to obtain predetermined accuracy, which makes the welding work difficult. On the other hand, according to the present invention, the recliners and the like are attached in the state of the long member, that is, in the state of a flexible structure, and even in a substantially U-shaped state after the subsequent bending, the flexible structure is still kept. Therefore, in the flexible structure state, the connection rod connecting the left and right recliners can be assembled and they can be accurately aligned, and then, after the alignment, the other end frame can be welded to form the rigid structure where the skeletal form is fixed, which can enhance accuracy of the attachment positions of the recliners and the like.

MODE FOR CARRYING OUT THE INVENTION

Figure 1:
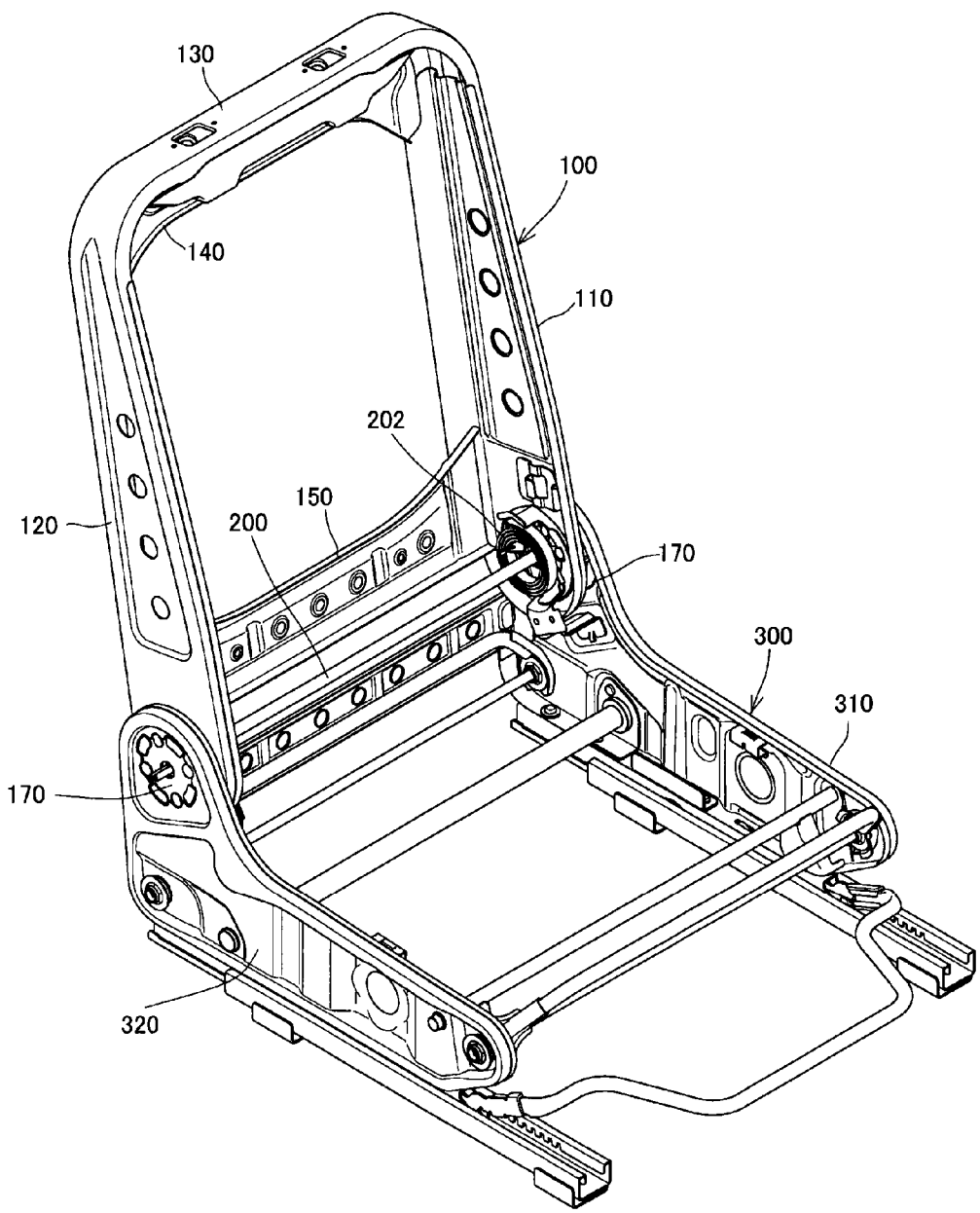
FIG. 1 is a perspective view illustrating seat frame structures of a seat structure manufactured by applying one embodiment of the present invention.
Figure 2:
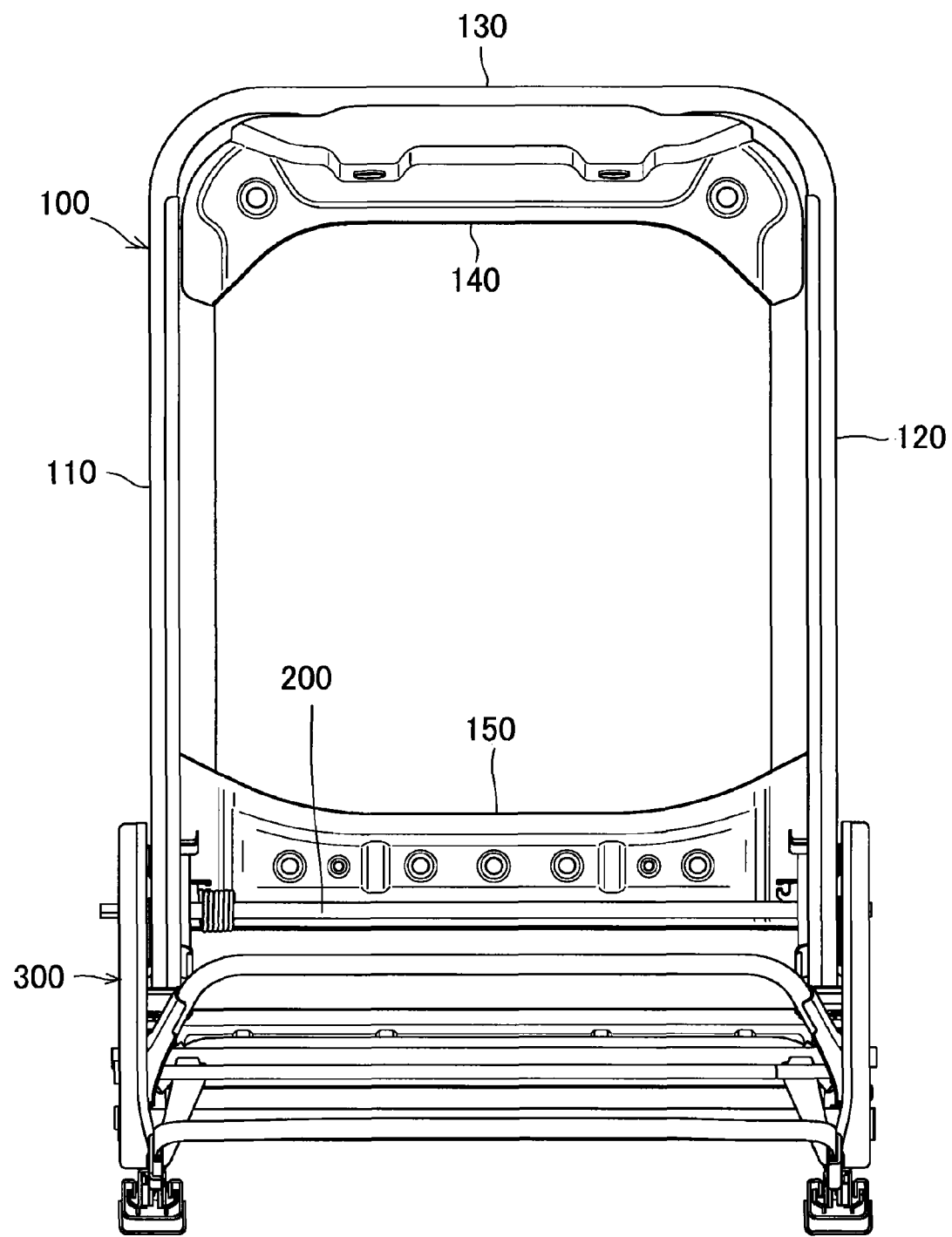
FIG. 2 is a front view of FIG. 1.
Figure 3:
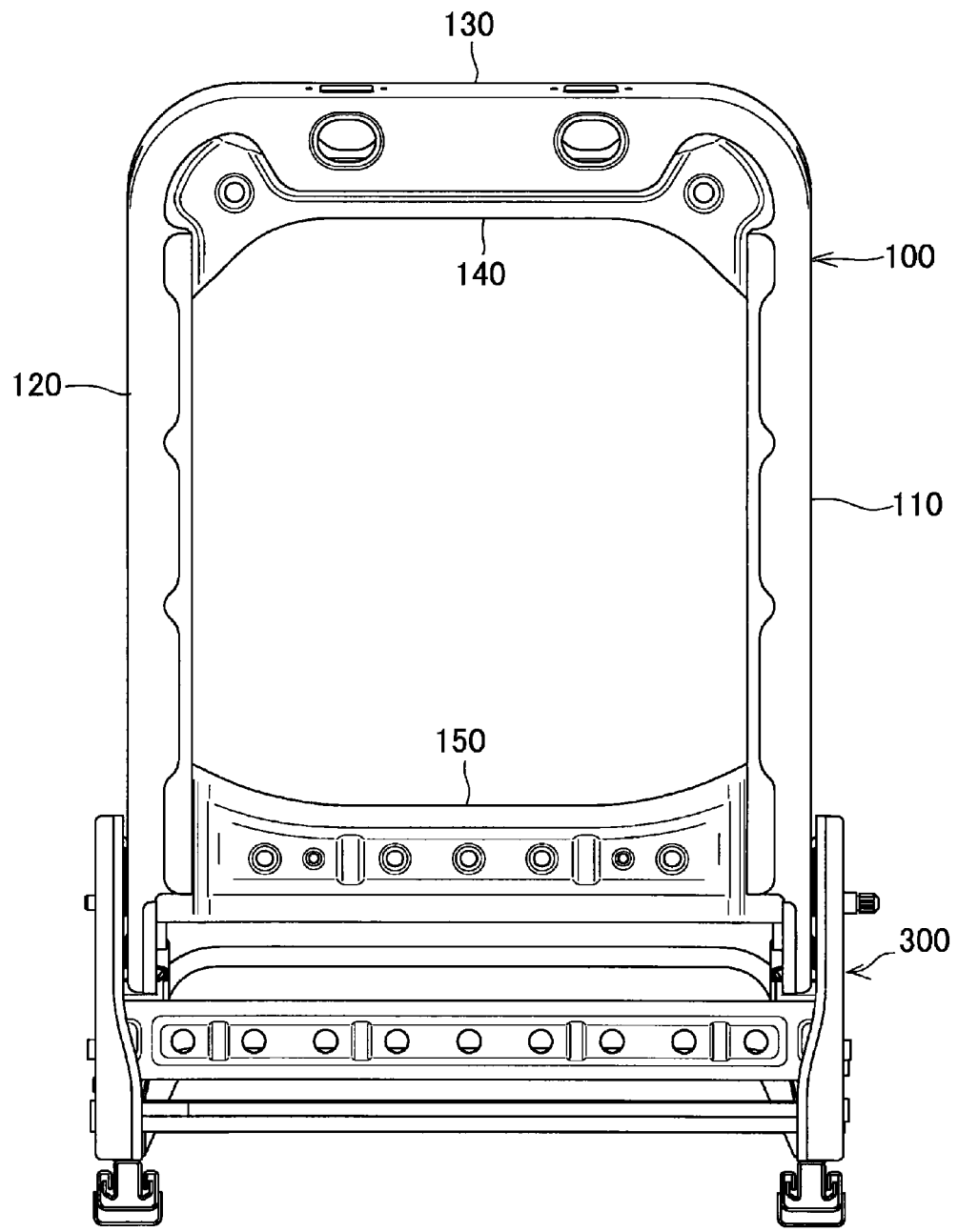
FIG. 3 is a rear view of FIG. 1.

Hereinafter, the present invention will be described in more detail based on embodiments illustrated in the drawings.

FIG. 1 to FIG. 4 are views illustrating seat frame structures for vehicles manufactured by the manufacturing method for the seat frame structure of the present invention, and first, an outline of the seat frame structures which are three-dimensionally assembled will be described. Note that, out of the seat frame structures, a seat frame structure which becomes a skeletal frame of a seat back part is a back frame 100, and a seat frame structure which becomes a a skeletal frame of a seat cushion part is a cushion frame 300.

The back frame 100 includes a pair of side frames 110, 120 disposed at a predetermined interval, an upper frame 130 disposed between upper portions of the side frames 110, 120, and a lower frame 150 disposed between lower portions of the side frames 110, 120. The lower portions of the side frames 110, 120 of the back frame 100 are coupled to rear portions of side frames 310, 320 of the cushion frame 300 of the seat cushion part 30 via recliners 170, and the back frame 100 is provided so as to be inclinable back and forth relatively to the cushion frame 300.

Figure 4:
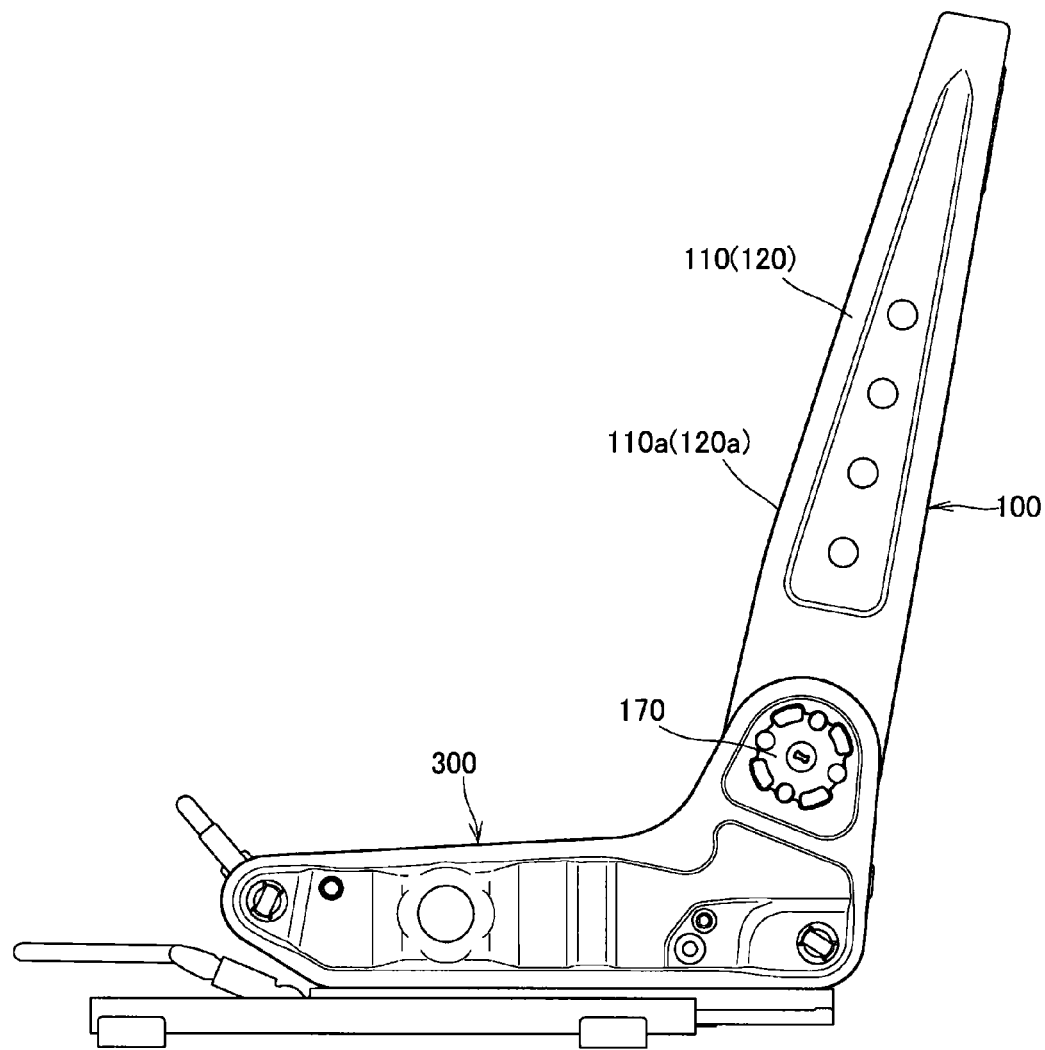
FIG. 4 is a side view of FIG. 1.

The side frames 110, 120 of the back frame 100 are formed of a plate-shaped member having a predetermined width and are disposed so that their width direction become a substantially back and forth direction. Concretely, as illustrated in FIG. 4, the side frames 110, 120 have a shape with their width becoming slightly wider from an upper side toward a lower side, and in a side view in a state where an angle of the back frame 100 relative to the cushion frame 300 is about 90 degrees, front edge portions 110a, 120a each have a shape along a line inclining so that it bulges slightly forward as it goes from the upper side toward the lower side.

The upper frame 130 is one end frame located between one-side ends of the aforesaid pair of side frames 110, 120, and in this embodiment, the pair of side frames 110, 120 and the upper frame 130 are integrally formed in a substantially U shape in a front view. The upper frame 130 is thus integrally formed with the side frames 110, 120, and is formed from the plate-shaped member similarly to the side frames 110, 120, and is disposed so that its width direction becomes substantially the back and forth direction.

The lower frame 150 is another end frame located between other ends of the aforesaid pair of side frames 110, 120, and in this embodiment, is joined between the other ends of the pair of side frames 110, 120 by welding.

Figure 5:
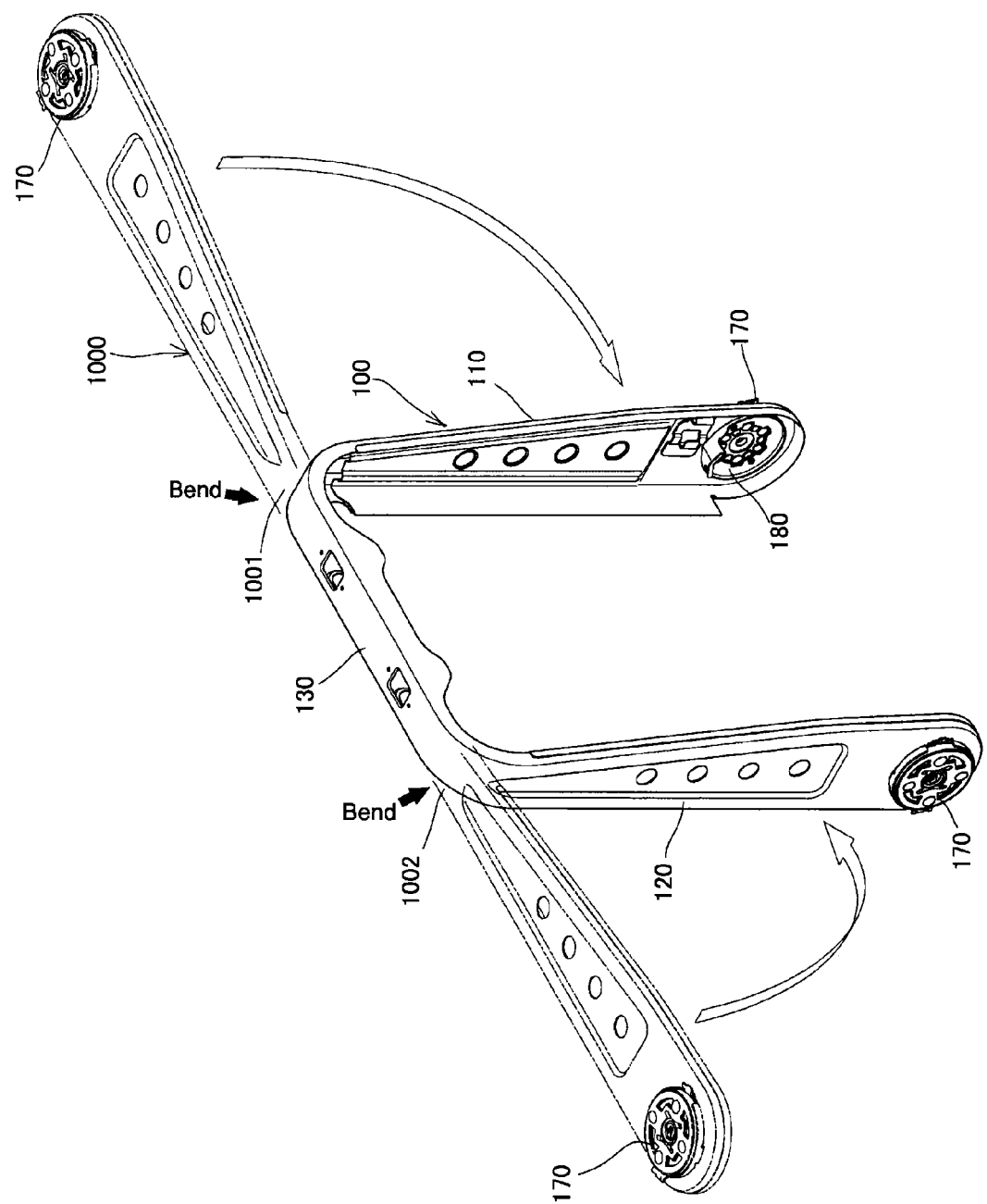
FIG. 5 is an explanatory view of a manufacturing method according to one embodiment of the present invention.

Next, the manufacturing method of the above-described back frame 100 will be described based on FIG. 5 to FIG. 7. First, in a first step, as illustrated in FIG. 5, one long member 1000 with a predetermined length is prepared. As this long member 1000, one obtained by working a flat steel sheet into a predetermined cross sectional shape by presswork or the like is used. Preferably, in its portions corresponding to the side frames 110, 120, two thin steel sheets 1101 and 1102, 1201 and 1202 are stacked, and they are worked into a cross-sectional shape illustrated in FIGS. 7(d) to (f). At this time, as illustrated in FIG. 7(e), a closed-cross sectional structure is formed by hemming the two thin steel sheets 1101 and 1101, 1201 and 1202 to increase strength. Incidentally, the two thin steel sheets are firmly joined by, for example, spot welding as illustrated in FIGS. 7(b), (c). A work of this spot welding is easy because it is performed when the long member 1000 is in a substantially flat and two-dimensional long state illustrated in FIG. 5.

Figure 6:
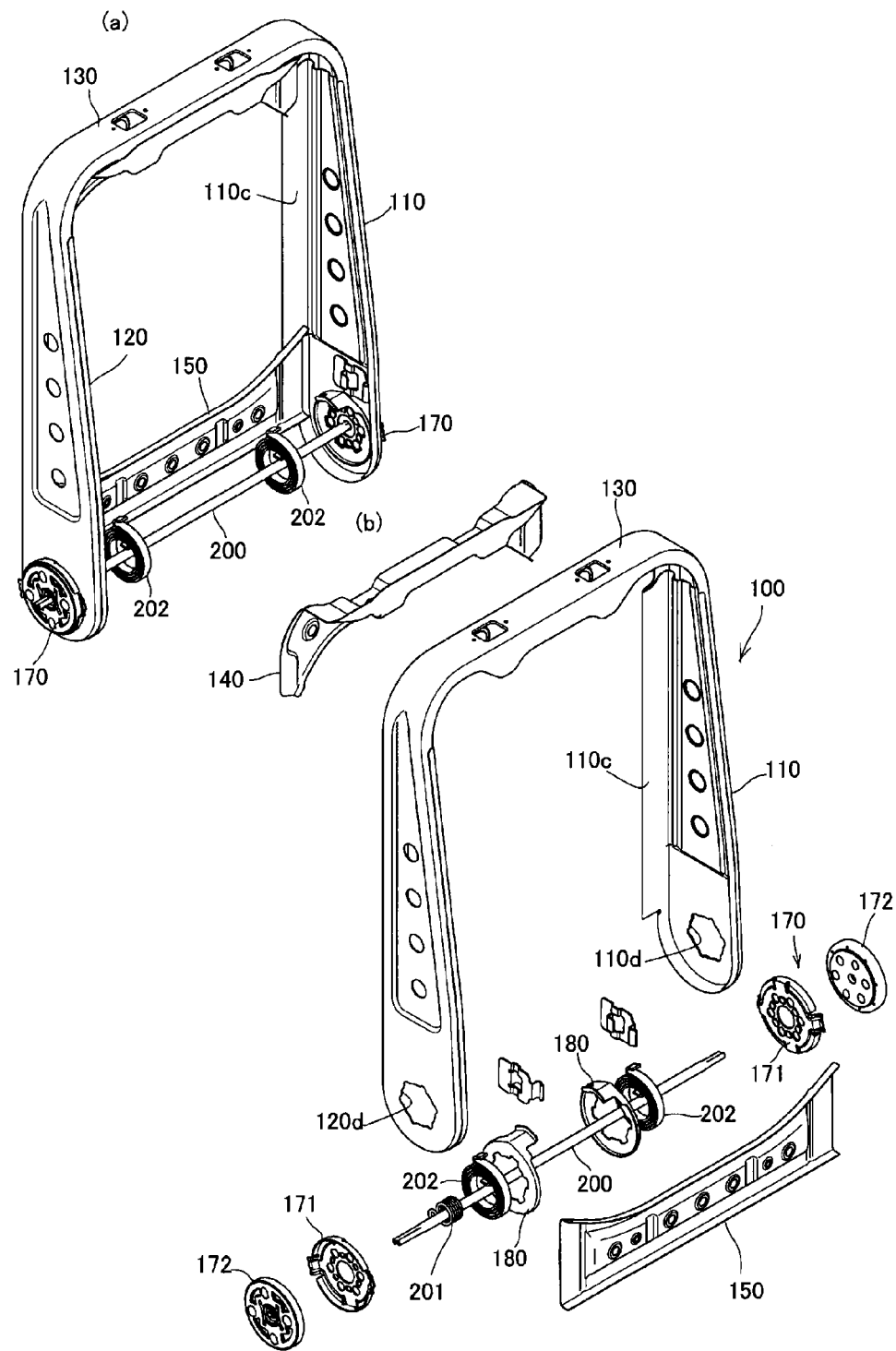
FIG. 6(a) is a perspective view illustrating a structure of a back frame after bending.
FIG. 6(b) is an exploded perspective view of (a).
Figure 7:
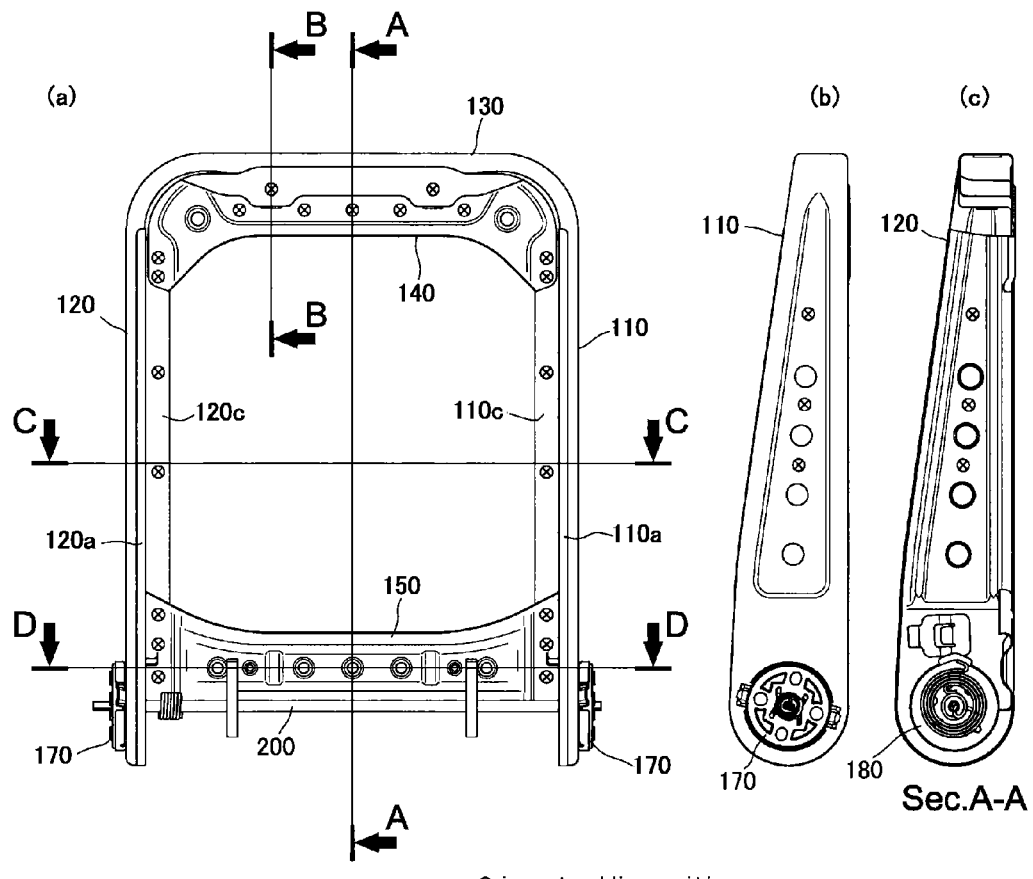
FIG. 7(a) is a front view illustrating spot-welded portions after the bending.
FIG. 7(b) is a side view.
FIG. 7(c) is a cross-sectional view taken along A-A line in (a)
FIG. 7(d) is a cross-sectional view taken along B-B line in (a)
FIG. 7(e) is a cross-sectional view taken along C-C line in (a)
FIG. 7(f) is a cross-sectional view taken along D-D line in (a).
Figure 7:
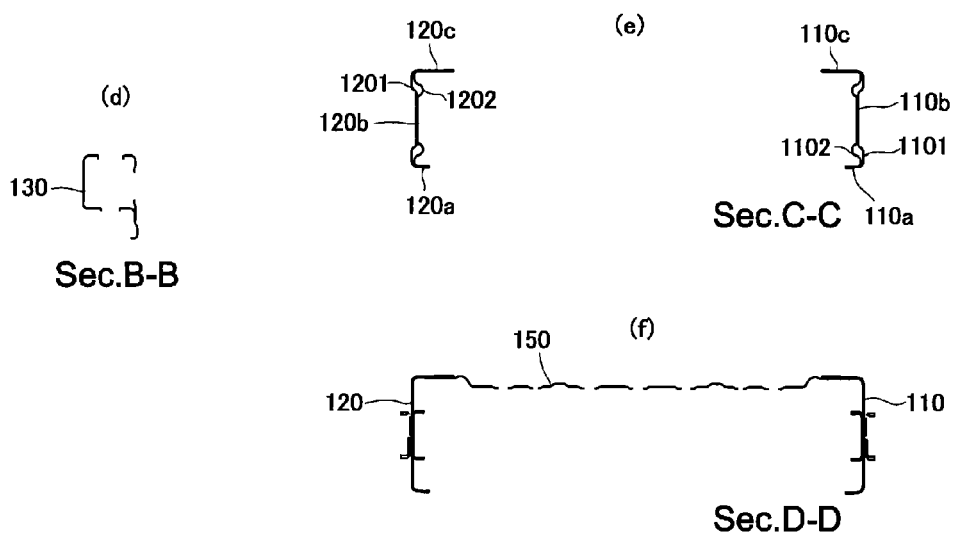

Further, as illustrated in FIG. 5 and FIG. 6, the portions corresponding to the side frames 110, 120 are formed so as to be in a substantially U-shape in a horizontal cross sectional view by the combination of front edge portions 110a, 120a, side surface portions 110b, 120b, and rear edge portions 110c, 120c, but in a front view, the rear edge portions 110c, 120c are wider than and protrude more inward than the front edge portions 110a, 100b as illustrated in FIG. 6(b) and FIG. 7. Consequently, the rear edge portions 110c, 120c become joining margins when the lower frame 150 and so on are joined by spot welding or the like.

As illustrated in FIG. 5, in the state of the long member 1000, the presswork is performed and further the portions corresponding to the side frames 110, 120 are hemmed by using the two thin steel sheets 1101 and 1102, 1201 and 1202 as described above, and then, the recliners 170 are attached to the portions corresponding to the lower ends of the side frames 110, 120, that is, to the vicinities of both end portions on upper ends of the long member 1000 by an arbitrary fastening means. As illustrated in FIGS. 6(a), (b) and FIG. 8(b), the recliners 170 each include an attachment ring 171 and a main body portion 172 fittingly supported in the attachment ring 171 and including an internal gear, a guide bracket, and so on. The recliners 170 are attached to inner brackets 180 fixed to inner surface sides of attachment holes 110d, 120d penetrating through the vicinities of the end portions of the side frames 110, 120, from opposite surface sides of the side frames 110, 120 by using bolts. In this embodiment, a step of attaching the recliners 170 is performed while the long member 1000 is in the long state illustrated in FIG. 5. That is, since the recliners 170 can be attached while the long member 1000 is in the two dimensional and thus substantially flat state all along a length direction, it is possible to easily perform the work.

Note that the fastening means for attaching the members in the first step is not limited to the fastening means using the aforesaid bolts, but bolt fastening using pierce nuts, welding fastening, caulking fastening (including tox caulking, hemming, and the like), or other fastening means can be selected according to the attached components. In any case, since the long member 1000 to be worked is in the two dimensional state, these works can be easily performed. Further, since the long member 1000 is in the two dimensional state, a fastening jig such as a roller of a caulking machine can be operated from either an upper direction or a lower direction of the long member 1000, which is suitable for handling by an automated device and thus can facilitate the work and reduce cost. Further, in the first step, at least part of the long member 1000 is heat-treated, which can increase the strength of the part. In this case as well, since the heat treatment work can be performed while the long member 1000 is in the two dimensional and thus substantially flat state, a heat treating part of a heat treatment device only has to be disposed on at least one of upper and lower surfaces of the long member 1000, which has an advantage that the heat treatment work can be easily automated.

In this embodiment, the aforesaid presswork, hemming, attachment work of the recliners 170, and so on to the long member 1000 are followed by bending, as a second step, of bending the long member 1000 into a substantially U shape in the arrow direction from predetermined bending positions 1001, 1002 as illustrated in FIG. 5. Consequently, a portion sandwiched by the bending positions 1001, 1002 becomes the upper frame 130, portions on outer sides of the bending positions 1001, 1002 become the side frames 110, 120, and they are integrally formed into a three dimensional shape. Consequently, frames at three places of the back frame 100, that is, the pair of side frames 110, 120 and the upper frame 130 can be formed at a time, and in addition, the necessary components have already been attached at this stage by the aforesaid first step, which also facilitates the working and reduces manufacturing cost.

The bending is followed by the aligning of the left and right recliners 170. At the stage where the long member 1000 is bent, the pair of side frames 110, 120 and the upper frame 130 only form the substantially U shape, which is still a flexible structure allowing a slight deformation. Therefore, the left and right recliners 170 are connected by a connection rod 200 in this state as illustrated in FIGS. 6(a), (b). Then, while the left and right synchronization of the pair of side frames 110, 120 which are left as the flexible structure is adjusted, the left and right components are aligned so that centers of the left and right recliners 170 are positioned on an axis of the connection rod 200. This positioned or aligned state is maintained by using a maintaining jig, and finally, the lower frame 150 is joined by welding, whereby a rigid structure is formed. As a result, it is possible to easily align the centers of the left and right recliners 170 with the axis of the connection rod 200. Incidentally, coil springs 201 for operation lever and spiral springs 202 for returning operation of the recliners 170 illustrated in FIG. 6(b) are inserted to the connection rod 200 before the connection rod 200 is connected to the recliners 170.

After the bending and the alignment of the recliners 170, as a third step, the end portions of the lower frame 150 are joined to the rear edge portions 110c, 120c as the margins protruding inward, of the side frames 110, 120, as illustrated in FIG. 7(a). Further, both side portions of a reinforcing frame 140 fitted to the upper frame 130 from under are also joined to the rear edge portions 110c, 120c and the upper frame 130. The joining work of the lower frame 150 and the reinforcing frame 140 is not particularly limited, but it is done by spot welding in this embodiment. According to this embodiment, the number of welded portions is smaller, as compared with the conventional case where the side frames 110, 120 and the upper frame 130 are formed separately, and the reduction itself in the number of the welded portions lowers a possibility that spatter scatters to other components. In addition, as described above, the recliners 170 are disposed on the outer surface sides of the side frames 110, 120, while the spot-welded portions are on the rear edge portions 110c, 120c located on the inner surface sides of the side frames 110, 120, which can further reduce the adhesion of the spatter to the recliners 170.

Figure 8:
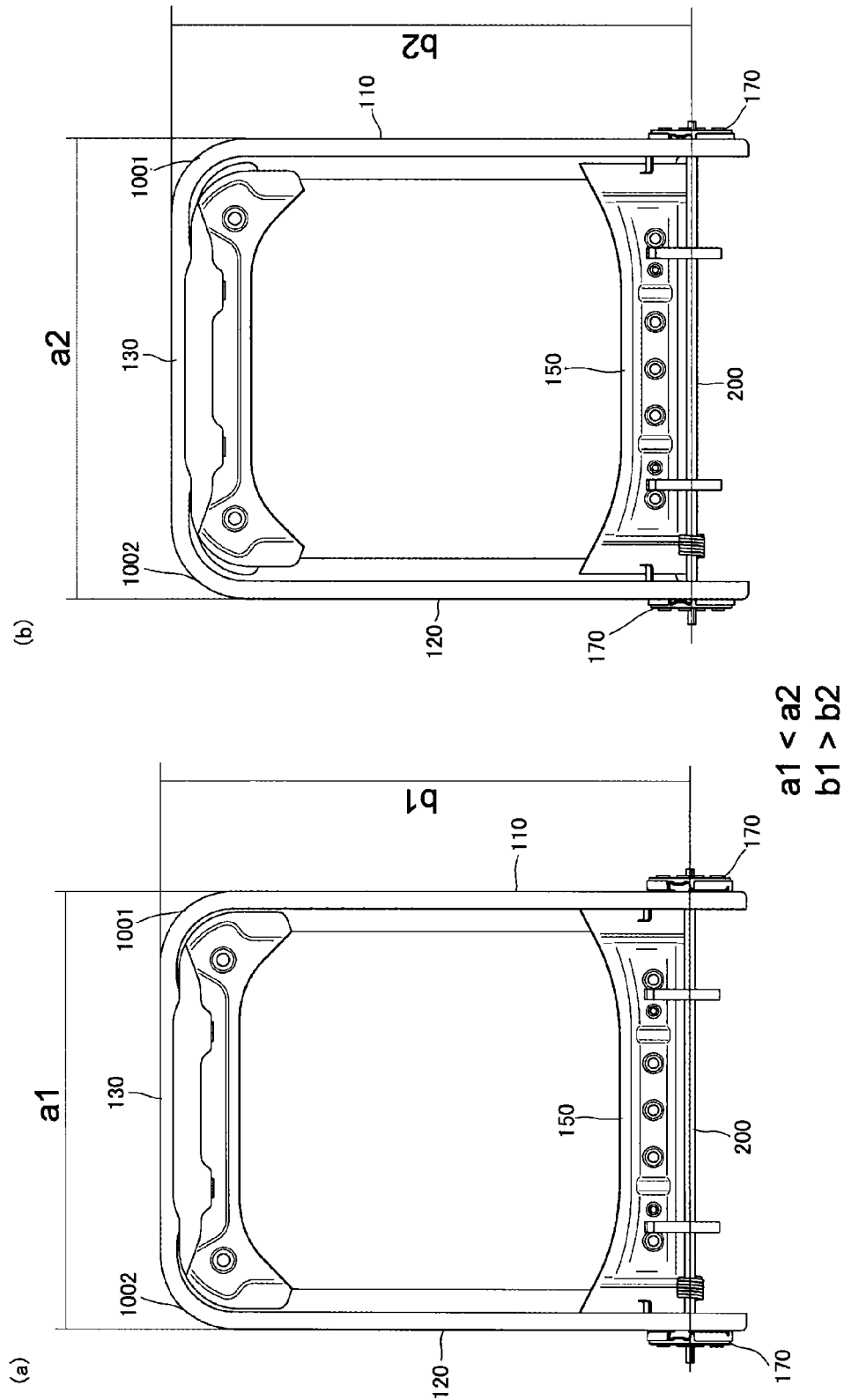
FIGS. 8(a), (b) are front views illustrating back frames when long members are bent at different bending positions.

In this embodiment, as described above, after the recliners 170 and so on are attached to the long member 1000 in the two dimensional and thus substantially flat state, the long member 1000 is formed into the three-dimensional shape by being bent at the predetermined positions, but the bending positions 1001, 1002 may be set arbitrarily. Therefore, by adjusting the bending positions 1001, 1002 to, for example, a1<a2 and b1>b2 as illustrated in FIGS. 8(a), (b), it is possible to easily adjust the dimension so that the back frame 100 becomes relatively slender as in FIG. 8(a) and the back frame 100 becomes relatively wide as in FIG. 8(b), in a front view. That is, even though the long members 1000 have the same dimension and shape, it is possible to form the back frames 100 different in dimension and shape, which can greatly contribute to a reduction in manufacturing cost. Further, the means for making the back frames 100 different in dimension and shape can be realized by adjusting at least one of the number of bending positions, a bend radius, a bending angle, and the shape of the vicinities of the bending positions (bent portions) of the long member 1000. Thus using the common long members 1000 makes it possible to reduce the manufacturing cost, but generally, an S spring forming a pelvis supporting member suspended between the side frames 110, 120 is attached to the lower frame 150. Then, using one with a fishmouth as the S spring makes it possible to commonly use the S springs with one size even for structures different in an interval between the side frames 110, 120.

Figure 9:
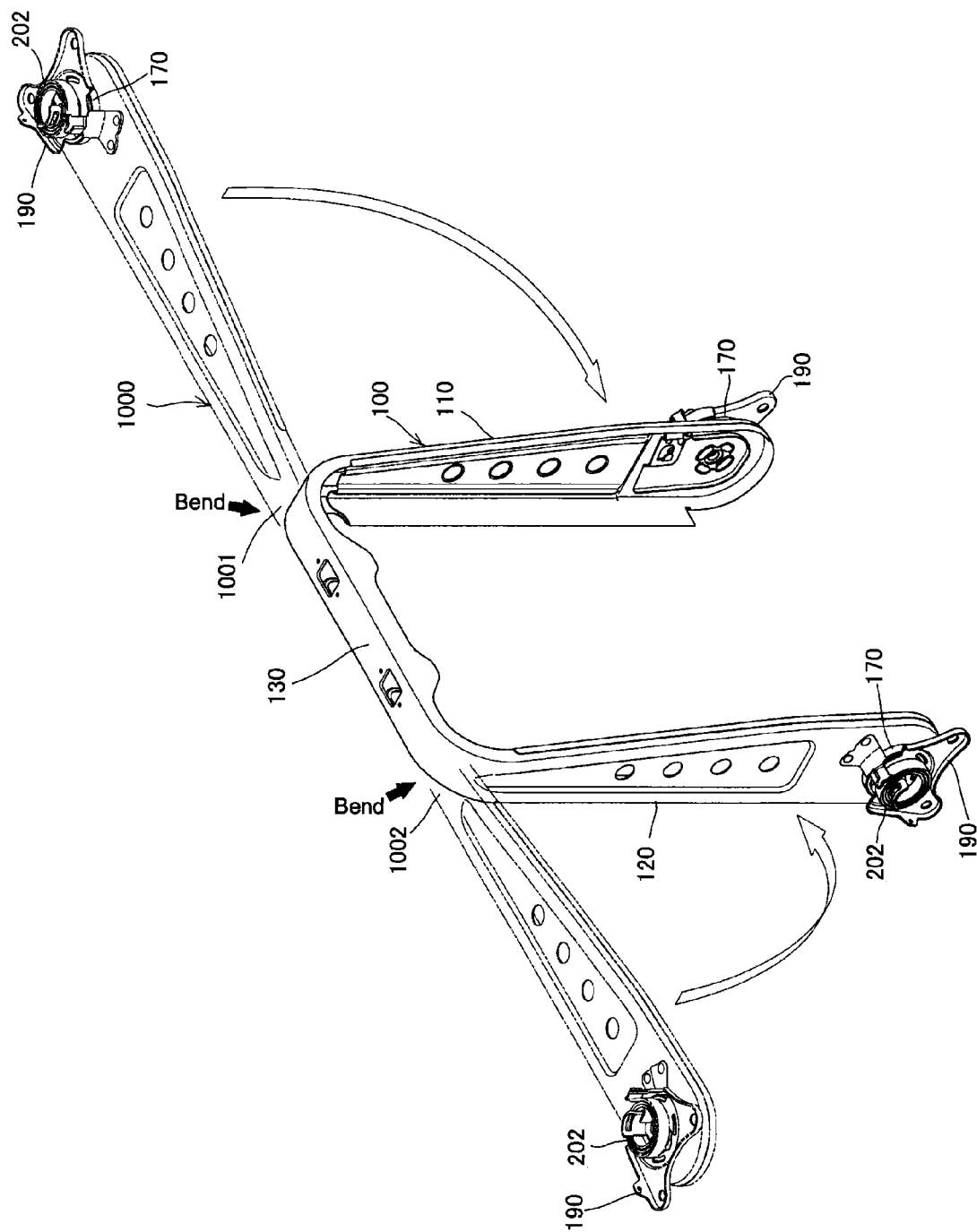
FIG. 9 is a view illustrating a method of performing bending, with recliners and brackets being attached to the long member.

FIG. 9 is an example where the long member 1000 in which the spiral springs 202 and the brackets 190 for connecting the side frames 310, 320 of the cushion frame 300 are attached in advance to the outer surface sides of the side frames 110, 120 is bent. Before the bending, not only the recliners 170 but also various recliner-associated components such as the spiral springs can be thus attached to the long member 1000 not bent yet. Moreover, it is also possible to attach lumbar support-associated components, headrest-associated components, adjusting mechanism-associated components, and so on in advance to the long member 1000 in the two dimensional state.

Incidentally, after worked into predetermined shapes by the above-described manufacturing method, the back frame 100 and the cushion frame 300 forming the seat frame structure according to the above-described embodiment are further provided with various cushion members such as three-dimensional knitted fabrics, two-dimensional woven fabrics, and urethane members, and the resultant is provided as the seat structure.

Further, in the above-described embodiment, the working of the back frame 100 is described, but the similar working is applicable to the cushion frame 300. For example, by bending the long member 1000 at predetermined positions similarly to the above, it is possible to manufacture the pair of side frames and a front edge frame connecting front portions of the side frames.

In the above-described embodiment, only the single long member 1000 is used, but due to the facility and so on, it is sometimes difficult to mold the long member 1000 having the total length of the three frame parts, that is, the pair of side frames 110, 120 and the upper frame 130. In such a case, by preparing two long members 1100, 1200 each having a length of each of sections into which the total length is divided at a position corresponding to a substantially center of the upper frame 130, it is also possible to manufacture the seat frame structure through the same steps as those described above.

Figure 10:
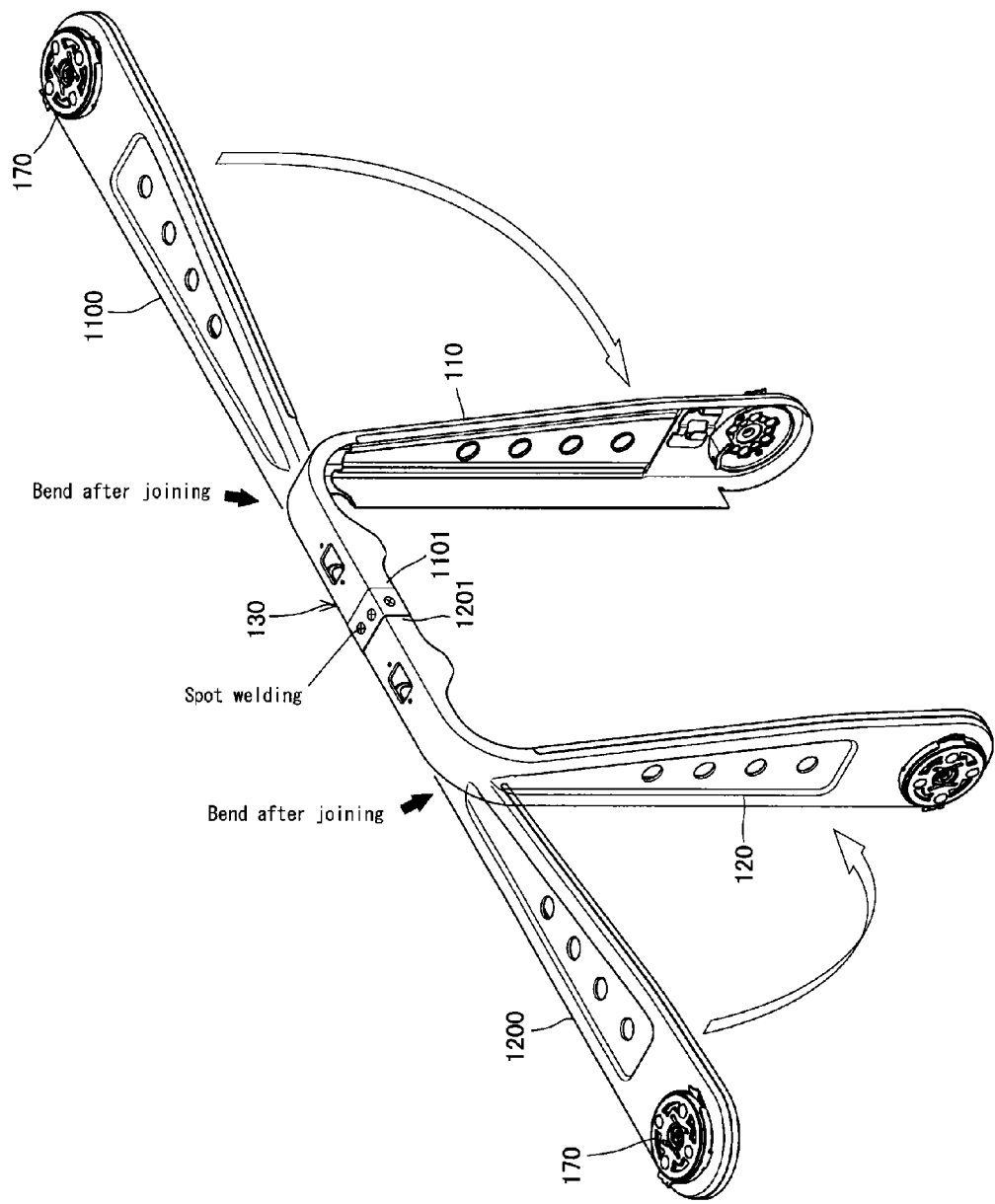
FIG. 10 is an explanatory view of a manufacturing method according to another embodiment of the present invention.

For example, the recliners 170 are attached to the respective two long members 1100, 1200 in the same manner as the above while the long members 1100, 1200 are kept in a flat state, as illustrated in FIG. 10, for instance. Thereafter, the two long members 1100, 1200 are joined by spot welding or the like, with their end portions 1101, 1201 confronted with each other. This results in substantially the same length as that of the aforesaid long member 1000. Thereafter, the seat frame structure is manufactured by performing the bending, the alignment of the recliners 170, the welding of the lower frame 150, and so on as in the above-described embodiment.

Figure 11:
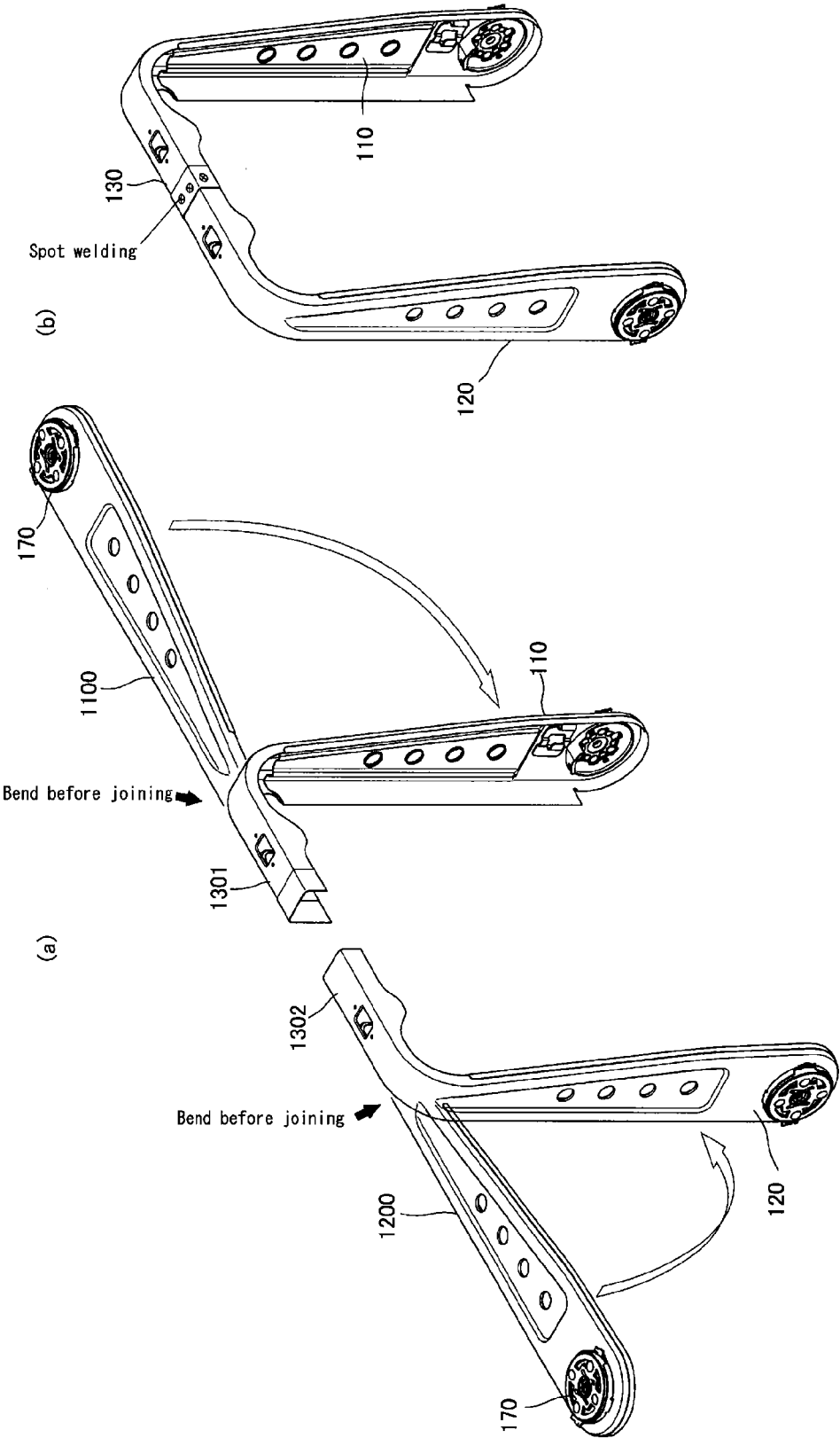
FIGS. 11(a), (b) are explanatory views of a manufacturing method according to still another embodiment of the present invention.

Alternatively, as illustrated in FIG. 11, for example, after the recliners 170 are attached to the respective two long members 1100, 1200 while the long members 1100, 1200 are kept in the flat state in the same manner as above, the two long members 1100, 1200 are bent as illustrated in FIG. 11(a). Consequently, substantially L-shaped members having portions 1301, 1302 corresponding to substantial halves of the one end frame (the upper frame 130) and portions corresponding to the side frames 110, 120 adjacent to the portions 1301, 1302 are formed. After the substantially L-shaped members are formed, the substantially half portions 1301, 1302 of the upper frame 130 are confronted to be joined, as illustrated in FIG. 11(b). This results in the state where the aforesaid single long member 1000 is bent, and thereafter, the aligning of the recliners 170, the welding of the lower frame 150, and so on are performed as in the above-described embodiment.

Even when such two long members 1100, 1200 are used, in the state where the predetermined components such as the recliners 170 are attached while the two long members 1100, 1200 are in the flat two dimensional state and thereafter are bent, the resultant structure is still the flexible structure, which can exhibit the operations and effects such as a reduction in manufacturing cost, improvement of attachment accuracy of the recliners and so on as in the above-described embodiment.

INDUSTRIAL APPLICABILITY

The manufacturing method for the seat frame structure of the present invention is applicable to the manufacture of a back frame and a cushion frame of a seat structure for vehicles such as automobiles, trains, and airplanes and in addition applicable to office chairs and sofas for household furniture.

EXPLANATION OF REFERENCE SIGNS 100 back frame
110, 120 side frame
110c, 120c rear edge portion
130 upper frame
150 lower frame
170 recliner
200 connection rod
300 cushion frame
1000 long member
1001, 1002 bending position

The invention claimed is:

1. A manufacturing method for a seat frame structure for a skeletal back frame of a seat back part of the seat frame structure, the method comprising:
a first step of attaching a left and right recliner at a vicinity of each end portion of a long member having a predetermined length while the long member is kept in a substantially flat state; and
a second step of bending the long member at predetermined positions in a state where each recliner is attached to the long member, to form a pair of side frames and an upper frame located between a top end of the pair of side frames, the pair of side frames and the upper frame forming the skeletal back frame; and
a third step of joining a lower frame between a lower end of the pair of side frames to form a rigid structure;
wherein, after the second step and before the rigid structure is formed by the execution of the third step, the method comprising a step of connecting a connection rod between the left and right recliners attached to the pair of side frames, and aligning centers of the left and right recliners with an axis of the connection rod.

2. The manufacturing method for the seat frame structure according to claim 1, wherein the long member of the first step is one flat plate member.

3. The manufacturing method for the seat frame structure according to claim 1, wherein the long members of the first step are two flat plate members, the step of attaching the right and left recliners in the first step is executed for each of the long members, next the two long members are joined with end portions thereof confronted with each other, and thereafter in the second step, the joined long members are bent to form the pair of side frames and the upper frame.

4. The manufacturing method for the seat frame structure according to claim 1, wherein the long members of the first step are two flat plate-shaped members, the step of attaching the left and right recliners in the first step is executed for each long members, and next, the bending in the second step is executed for each of the long members to work each of the long members into a substantially L-shape having a substantially half portion of the upper frame and a portion corresponding to the side frame adjacent to the substantially half portion, and the long members worked into the substantially L-shape are joined, with the substantially half portions of the upper frame confronted with each other.

5. The manufacturing method for the seat frame structure according to claim 1, wherein the first step includes a step of working a flat plate member into a predetermined cross sectional shape to form the long member.

6. The manufacturing method for the seat frame structure according to claim 1, wherein the first step, the left and right recliners are attached to the long member in the substantially flat state by any of the following fastening means including: welding fastening, caulking fastening, and bolt fastening.

7. The manufacturing method for the seat frame structure according to claim 1, wherein the first step includes a step of heat-treating at least part of the long member.

8. The manufacturing method for the seat frame structure according to claim 1, wherein, in the first step, portions corresponding to rear edge portions of the pair of side frames after the bending are each worked into a cross sectional shape protruding inward in terms of a direction after the bending so that the portions serve as joining margins of the lower frame.

9. The manufacturing method for the seat frame structure according to claim 8, wherein, in the first step, the recliners are attached to outer surfaces of the pair of side frames.

* * * * *